United States Patent
Gautier et al.

(10) Patent No.: US 8,203,945 B2
(45) Date of Patent: Jun. 19, 2012

(54) METHOD, PROGRAM, AND SYSTEM FOR TRANSFERRING DATA BETWEEN A NUMBER OF TERMINALS THAT COMMUNICATE VIA A COMMON COMMUNICATION CHANNEL IN A WIRELESS NETWORK, AND A WIRELESS TERMINAL

(75) Inventors: André Gautier, Issy les Moulineux Cédex (FR); Christian Bouissou, Issy les Moulineaux Cédex (FR)

(73) Assignee: France Telecom, Paris (FR)

( * ) Notice: Subject to any disclaimer, the term of this patent is extended or adjusted under 35 U.S.C. 154(b) by 428 days.

(21) Appl. No.: 12/083,230

(22) PCT Filed: Oct. 23, 2006

(86) PCT No.: PCT/FR2006/051088
§ 371 (c)(1),
(2), (4) Date: Apr. 8, 2008

(87) PCT Pub. No.: WO2007/048968
PCT Pub. Date: May 3, 2007

(65) Prior Publication Data
US 2009/0135719 A1    May 28, 2009

(30) Foreign Application Priority Data

Oct. 24, 2005  (FR) .................................... 05 10843

(51) Int. Cl.
*G01R 31/08* (2006.01)
*H04W 4/00* (2009.01)
*H04J 3/06* (2006.01)
*H04L 12/413* (2006.01)

(52) U.S. Cl. ......... 370/230; 370/329; 370/350; 370/445

(58) Field of Classification Search .................. 370/230, 370/443–445
See application file for complete search history.

(56) References Cited

U.S. PATENT DOCUMENTS

| 5,548,814 A * | 8/1996 | Lorang et al. ............. 370/310 |
| 2002/0080768 A1* | 6/2002 | Garcia-Luna-Aceves et al. ................ 370/349 |
| 2004/0240426 A1* | 12/2004 | Wu et al. ............. 370/350 |
| 2005/0058151 A1* | 3/2005 | Yeh ................. 370/445 |
| 2005/0089057 A1* | 4/2005 | Kang et al. .......... 370/445 |
| 2005/0169232 A1* | 8/2005 | Sakoda et al. ........ 370/347 |

(Continued)

OTHER PUBLICATIONS

Weber et al.; "Aktuelle Trends in Kommunikationsnetzen—Ad Hoc Protokolle;" *LMU/TU Munchen*; Oct. 2002; pp. 1-44.

(Continued)

*Primary Examiner* — Brandon Renner
(74) *Attorney, Agent, or Firm* — Oliff & Berridge, PLC

(57) ABSTRACT

According to this method, each terminal is adapted to cover a coverage area. The method includes a step of sending a request-to-send data signal from a first terminal to a second terminal located in its coverage areas to advise the second terminal that the first terminal is requesting to send it data, and a step of sending a clear-to-send data signal to the first terminal to advise the first terminal that the second terminal is available to receive the data. The method further includes a step of a third terminal that has received the clear-to-send data signal and has not received the request-to-send signal sending a request-to-receive data signal to advise that it is available to receive data.

17 Claims, 4 Drawing Sheets

U.S. PATENT DOCUMENTS

2006/0268760 A1* 11/2006 Fang et al. .................... 370/328
2007/0025288 A1* 2/2007 Nagai et al. .................... 370/329

OTHER PUBLICATIONS

Talucci et al.; "MACA-BI (MACA By Invitation) A Wireless MAC Protocol for High Speed ad hoc Networking;" *International Conference on Universal Personal Communications Record.*; Oct. 12, 1997; pp. 913-917; vol. 2. Conf. 6.

Tong et al.; "DuraNet: Energy-Efficient Durable Slot-Free Power Scheduling;" *Computer Science Division*; May 2004; pp. 1-15; University of California; Berkeley, California.

\* cited by examiner

METHOD, PROGRAM, AND SYSTEM FOR TRANSFERRING DATA BETWEEN A NUMBER OF TERMINALS THAT COMMUNICATE VIA A COMMON COMMUNICATION CHANNEL IN A WIRELESS NETWORK, AND A WIRELESS TERMINAL

The present invention relates to a method, a program and a system for transferring data between a number of terminals that communicate via a common communication channel in a wireless network, and to a wireless terminal.

In such wireless networks with only one communication channel, each terminal can receive data from any other terminal of the network.

Each terminal is able to send data to its own coverage area and each other terminal located in that coverage area is able to receive the data sent, even if that other terminal is not the intended recipient of the data.

Accordingly, a terminal can sometimes be located in coverage areas of more than one other terminal and can therefore receive simultaneously data sent by two or more other terminals.

Since this data is being sent on the same channel, the terminal receiving the data is not able to distinguish between data sent by different terminals. This is referred to as a data collision.

In order to avoid certain collisions, each terminal located in the coverage area of another terminal that is in the process of sending must not send data while the channel is busy. That avoids collisions with data sent by that other terminal that is in the process of sending.

However, that does not resolve the situation where a terminal receives simultaneously data sent by two other terminals that are in the process of sending. Any terminal can start to send data without knowing that a terminal located in its coverage area is already receiving data from another terminal.

In order to limit the nuisance caused by collisions generated in this way, it is standard practice to use the CSMA/CA (Carrier Sense Multiple Access Protocol with Collision Avoidance) collision detection method. That method includes an acknowledgement step during which a receiver terminal acknowledges correct reception of data by sending an acknowledgement signal. Accordingly, if a sender terminal receives no acknowledgement signal after sending data to a receiver terminal, then there has been a collision and the data has not been received correctly. The sender terminal then sends the data again, generally after a random time period.

That collision detection method does not always avoid collisions, however.

There is also known, in the prior art, a method of transferring data between a plurality of terminals that communicate via a common communication channel in a wireless network, each terminal being adapted to cover a coverage area, the method including:

a step of sending a request-to-send data signal from a first terminal to a second terminal located in its coverage area to advise the second terminal that the first terminal is requesting to send it data; and a step of sending a clear-to-send data signal to the first terminal to advise the first terminal that the second terminal is available to receive the data.

That kind of method, conforming to the MAC 802.11 protocol, is generally called the RTS/CTS (Request-to-send/Clear-to-send data) method.

FIG. 1 represents a system for transferring data between wireless terminals by that prior art method.

In FIG. 1, each terminal T1, T2, T2', T3, T3', T4, T4', T is located in the coverage area of the two adjacent terminals. Data is transferred from the first terminal T1 to the second terminal T2.

In that method, in order to avoid collisions with data received by the second terminal T2, a terminal T3 located in the coverage area of the second terminal T2 should not send data. In particular, the terminal T3 should not send a clear-to-send data signal if another terminal T4 is sending a request-to-send data signal to the terminal T3. Accordingly, because no other terminal will be able to receive a clear-to-send data signal from the terminal T3, no terminal will be able to send data to the terminal T3 during transfer of data from the first terminal T1 to the second terminal T2.

Thus a drawback of that prior art is that none of the terminals T3 located in the coverage area of the second terminal T2 can receive data during transfer of data between the first terminal T1 and the second terminal T2.

One aim of the invention is to remove that drawback by providing a data transfer method that reduces blocking of certain terminals in the coverage area of the second terminal.

To this end, the invention consists in a data transfer method of the above type, characterized in that the method further includes a step of sending a request-to-receive data signal from a third terminal that has received the clear-to-send data signal and that has not received the request-to-send data signal sending a request-to-receive data signal to advise that the third terminal is available to receive data.

Accordingly, a third terminal located in the coverage area of the second terminal but not in the coverage area of the first terminal is able to advise terminals in its coverage area that it can receive data as soon as the clear-to-send data signal broadcast by the second terminal is received.

As a result, because it will have already received a signal indicating that the third terminal can receive data, another terminal that intends to send it data can do so without needing to send a request-to-send data signal or to receive a clear-to-send data signal.

There is therefore no risk of the third terminal sending a clear-to-send data signal during transfer of data from the first terminal to the second terminal.

Because it can receive data freely from another terminal, the third terminal is not entirely blocked.

The third terminal can be any terminal located in the coverage area of the second terminal and not located in the coverage area of the first terminal. Because the system can include numerous terminals of this type, the invention has the advantage of enabling all these terminals to receive data during transfer of data from the first terminal to the second terminal.

A data transfer method according the invention can also have one or more of the following features:

After the step of sending the request-to-send data signal and before a step of transferring the data, the data transfer method includes a step of waiting for a predefined time period sufficient for the steps of sending the clear-to-send data signal and sending the request-to-receive data signal to be completed before the step of transferring the data. Accordingly, in order to avoid collisions of data sent with those signals, the first terminal sends data only when all the clear-to-send data and request-to-receive data signals have been sent.

The request-to-send data signal and/or the request-to-receive data signal include(s) an identifier of the terminal sending the signal. Accordingly, the terminals receiving this signal know the identifier of the terminal requesting to send or receive data.

The request-to-send data signal and/or the clear-to-send data signal include(s) an identifier of the terminal that is the intended recipient of the signal. Accordingly, the terminals receiving this signal can tell if the signal is intended for them or not.

The request-to-receive data signal and/or the clear-to-send data signal and/or the request-to-receive data signal include(s) information concerning the time to transfer data between the first terminal and the second terminal. By means of this information, the terminals receiving the signal know the data transfer time and, if necessary, in order to avoid collisions, can be configured not to send signals during that transfer time.

At least one terminal is associated with a time parameter that is decremented over time and is unable to send a signal while this parameter has a non-zero value. Accordingly, this parameter enables blocking of the terminal, for example during transfer of data between the first and second terminals.

When a terminal receives a request-to-send data signal or a clear-to-send data signal of which it is not the intended recipient, its time parameter is incremented by a value corresponding to the information concerning the time to transfer data so as to retain a non-zero value until the first terminal has sent the data in its entirety to the second terminal.

The first terminal sends the request-to-send data signal only if the data to be transferred has a volume above a predetermined threshold, for example more than 500 bytes. Accordingly, with data of small volume, that can be sent quickly, another less time-consuming transfer method could be used, there being a lower risk of collision during the transfer.

The invention also consists in a data transfer program for a wireless: terminal including software instructions for:
  sending a request-to-send data signal to advise another terminal of the intention to send it data; and
  sending a clear-to-send data signal to advise another terminal that has sent it a request-to-send data signal that it is available to receive data;
the program being characterized in that it further includes a software instruction for:
  when the wireless terminal has received a clear-to-send data signal and has not received a request-to-send signal, sending a request-to-receive data signal to advise that the terminal is available to receive data.

The invention further consists in a wireless terminal adapted to communicate with other wireless terminals via a common communication channel in a wireless network, characterized in that it incorporates a data transfer program as defined above.

The invention finally consists in a system for transferring data between wireless terminals communicating via a common communication channel in a wireless network, characterized in that it includes at least one terminal as defined above.

The invention can be more clearly understood on reading the following description given by way of example only and with reference to the appended drawings, in which.

Figure 1:
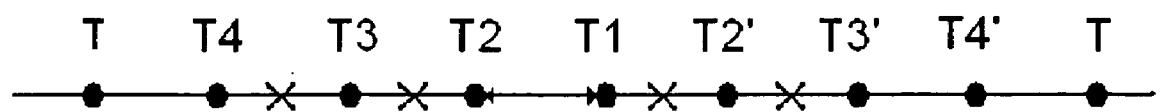
FIG. 1 represents a system for transferring data between wireless terminals by the prior art method described above.
Figure 2:
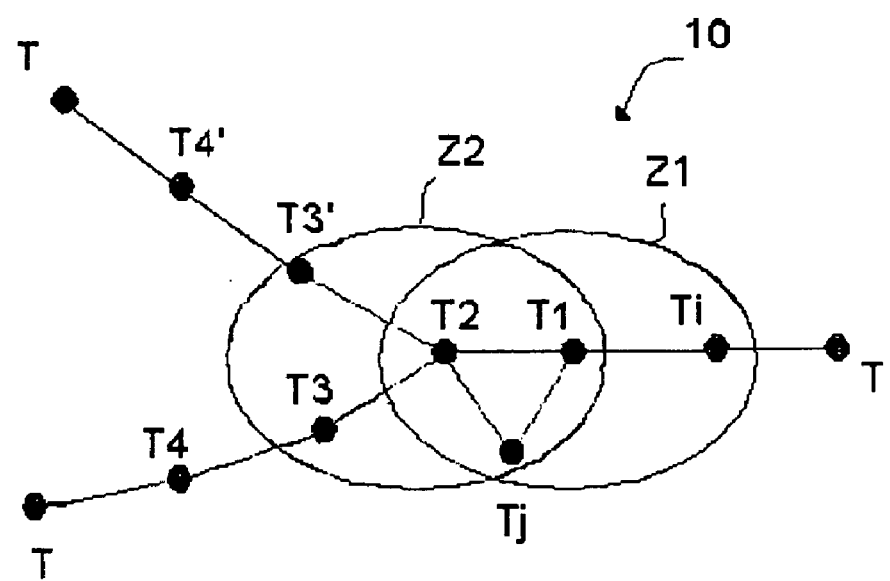
FIG. 2 represents a system constituting an embodiment of the invention for transferring data between wireless terminals.

FIG. 2 represents a wireless network 10 including a plurality of wireless terminals T, T1, T2, T3, T3', T4, T4', Ti, and Tj that communicate with one another via a common communication channel in the wireless network 10. In the example described here, the communication channel is a radio channel. In this example, two terminals are described as sending on the same channel if they are using the same sending frequency.

Each wireless terminal T, T1, T2, T3, T3', T4, T4', Ti, and Tj is either a mobile terminal or an access point, for example a fixed terminal.

The wireless network 10 includes a first terminal T1 with data to send to a second terminal T2 located in a first coverage area Z1 covered by the first terminal T1.

Terminals Ti and Tj are also located in the first coverage area Z1.

The second terminal T2 covers a second coverage area Z2 in which third terminals T3, T3' of the wireless network 10 are located. The terminal Tj is also located in the second coverage area Z2.

The third terminals T3, T3' also cover respective coverage areas in which other terminals T4 and T4' are located.

In the example described here, all the terminals cover coverage areas of substantially identical size.

Each wireless terminal of the network 10 incorporates a data transfer program.

That data transfer program includes a software instruction for sending a request-to-send data signal RTS when the wireless terminal intends to send data to another terminal. This request-to-send data signal RTS is intended to advise that other terminal that the wireless terminal intends to send it data.

The data transfer program also includes a software instruction for sending a clear-to-send data signal CTS when the wireless terminal receives a request-to-send data signal RTS that is addressed to it and it is available to receive the data, i.e. is not sending or receiving other data. The clear-to-send data signal CTS is intended to advise another terminal that has sent the request-to-send data signal RTS to the wireless terminal that it is available to receive the data.

The data transfer program further includes a software instruction for sending a request-to-receive signal RTR if the wireless terminal has received a clear-to-send data signal CTS and has not received a request-to-send signal RTS. This request-to-receive data signal RTR is intended to advise other terminals that the wireless terminal is available to receive data.

The data transfer program finally includes a software instruction for sending an acknowledgement signal ACK when the wireless terminal has received all of the data sent. This acknowledgement signal ACK is intended to advise another terminal that has sent data to the wireless terminal concerned that the data has all been received.

Furthermore, in order for no terminal to send signals during sending of data, each terminal is associated with a time parameter that is decremented over time and corresponds to a time period during which the terminal must not send signals. For example, each terminal is configured not to send signals if the associated time parameter has a non-zero value.

Finally, each wireless terminal is configured to be blocked during a short time period after each signal is sent or received known as the short interframe space (SIFS). This short time period represents a safety margin intended to avoid collisions between two successive signals sent or received.

Figure 3:
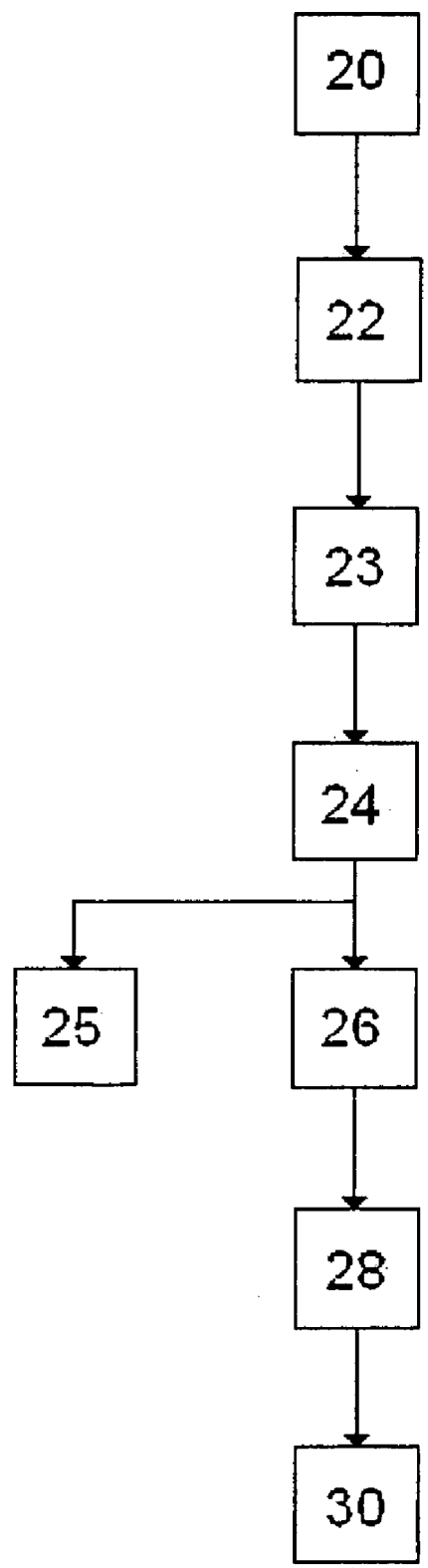
FIG. 3 represents steps of a method of transferring data between wireless terminals by the FIG. 2 system.
Figure 4:
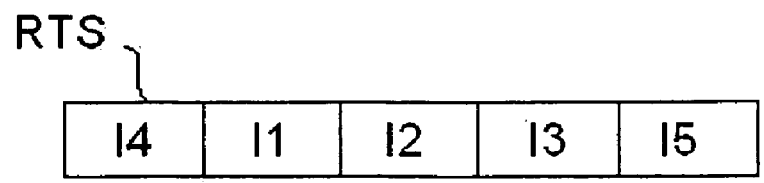
FIG. 4 represents diagrammatically the content of request-to-send data, clear-to-send data, and request-to-receive data signals exchanged between the wireless terminals of the FIG. 2 system.
Figure 4:
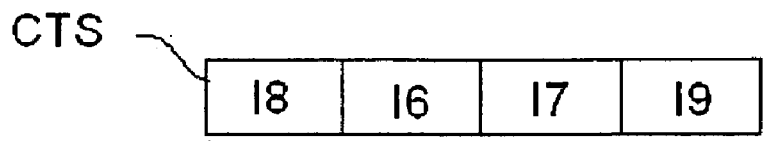
Figure 4:
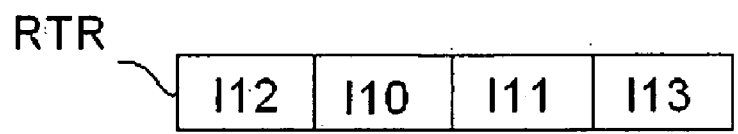
Figure 6:
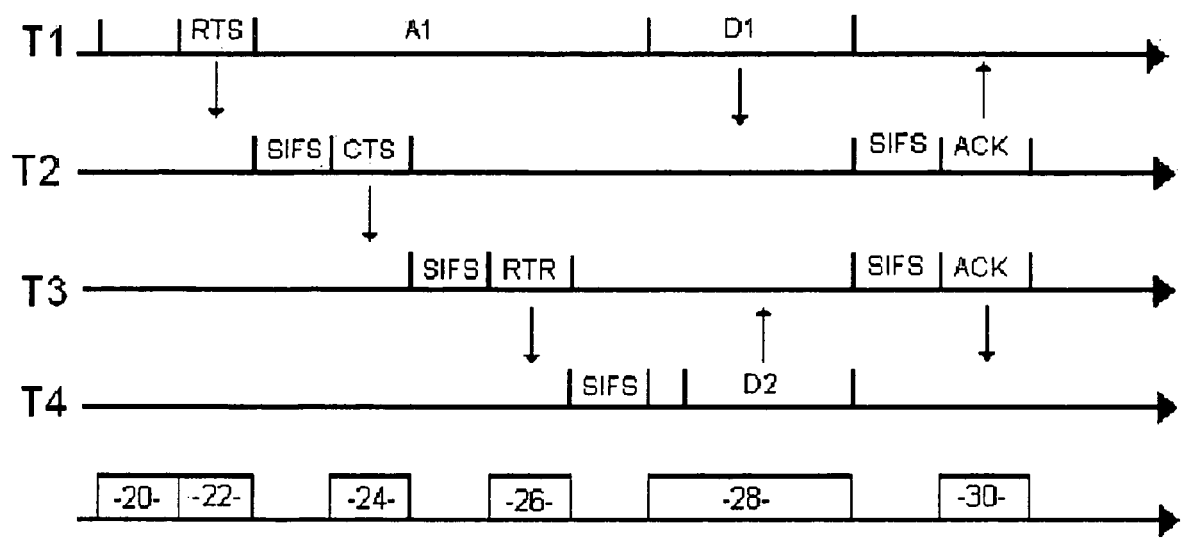
FIG. 6 represents diagrammatically the activities of the FIG. 2 terminals during execution of the FIG. 3 method.

FIG. 3 represents a method of transferring data between terminals of the network 10. FIG. 6 represents the activities of the terminals T1, T2, T3, and T4 during execution of this method.

In a first or initialization step 20, the first terminal T1 initializes the transfer of data D1 to the second terminal T2, which is located in its coverage area Z1.

The volume of data to be sent is preferably verified during this step. If the volume of data is below a predetermined threshold, for example 500 bytes, it is considered that there is no benefit in using the data transfer method of the invention and the data is sent using only a standard CSMA/CA collision detection method.

If the volume of data is above the predetermined threshold, the next step is a step 22 of sending from the first terminal T1 to the second terminal T2 a request-to-send data signal RTS. This request-to-send data signal RTS is intended to advise the second terminal T2 that the first terminal T1 is requesting to transfer data D1 to it.

The first terminal T1 sends this signal RTS to all points in the first area Z1 that it covers. Accordingly, all the terminals T2, Ti, Tj located in the first coverage area Z1 also receive the request-to-send data signal RTS.

In order for each terminal T2, Ti, Tj in the first coverage area Z1 to be able to tell which terminals are the sender and the intended recipient of the request-to-send data signal RTS, that signal carries information I1 identifying the terminal sending the signal and information I2 identifying the terminal that is the intended recipient of that signal (see FIG. 3). This information I1 and I2 generally includes MAC (Medium Access Control) addresses of the sender and receiver terminals.

Accordingly, any terminal Ti, Tj receiving the request-to-send data signal RTS that is not its intended recipient is blocked throughout the transfer of data in order for there to be no risk of sending signals that could collide with the signals sent by the first terminal T1.

In order to determine the time for which each of these terminals Ti, Tj must be blocked, the request-to-send data signal RTS carries information I3 concerning the predicted total time for the data D1 to be sent in its entirety from the first terminal T1 to the second terminal T2.

Figure 5:
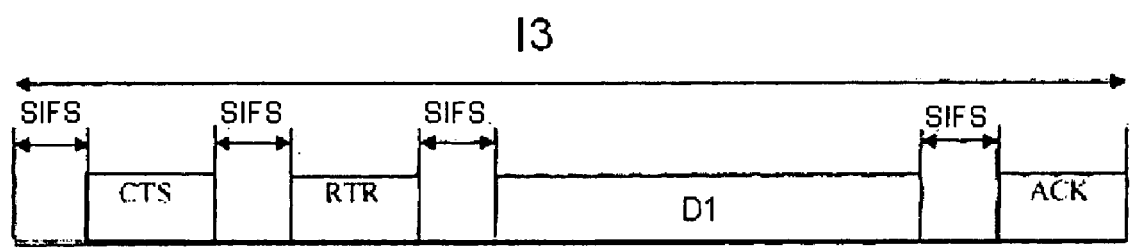
FIG. 5 represents diagrammatically information contained in the request-to-send data, clear-to-send data, and request-to-receive data signals concerning time periods between sending the respective signals and the end of data transfer.
Figure 5:
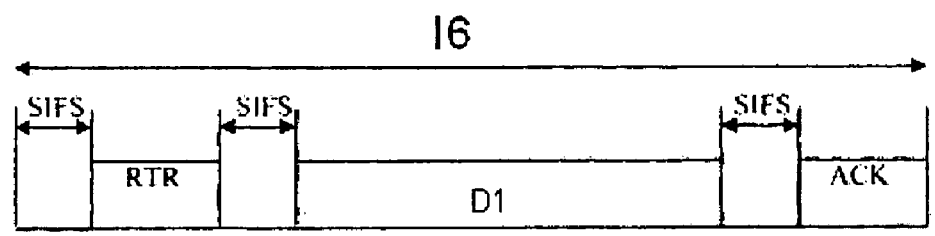
Figure 5:
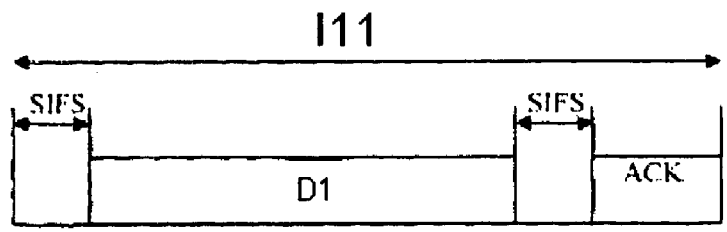

This total time, represented in FIG. 5, comprises:
the duration of a first SIFS;
the time to send a CTS signal;
the duration of a second SIFS;
the time to send an RTR signal;
the duration of a third SIFS;
the time to transfer the data D1;
the duration of a fourth SIFS; and
the time to send an ACK signal.

Accordingly, when a terminal Ti, Tj receives the request-to-send data signal RTS its time parameter is incremented by a value computed from this total duration so that it retains a non-zero value until the first terminal T1 has sent the data D1 in its entirety to the second terminal T2.

The request-to-send data signal RTS includes control information I4 and I5 respectively sent at the beginning and at the end of the request-to-send data signal RTS to verify that this signal has been received in its entirety.

After the first terminal T1 has sent the request-to-send data signal RTS, the next step is a step 23 during which the terminal T1 waits for a predefined time A1 that is sufficient for a clear-to-send data signal CTS and a request-to-receive data signal RTR to be sent.

This predefined time A1 therefore comprises:
the duration of a first SIFS;
the time to send a CTS signal;
the duration of a second SIFS;
the time to send an RTR signal; and
the duration of a third SIFS.

In order to prevent data colliding with a clear-to-send data signal CTS sent by the second terminal T2 or a request-to-receive data signal RTR received by the second terminal T2, the terminal T1 will be able to send the data D1 to the terminal T2 only when this waiting time has finished.

If the second terminal T2 is available to receive the data D1, i.e. if it is not sending or receiving other data, then the next step is a step 24 during which the second terminal T2 sends a clear-to-send data signal CTS for the attention of the first terminal T1. This clear-to-send data signal CTS is intended to advise the first terminal T1 that the second terminal T2 is available to receive the data D1.

This clear-to-send data signal CTS is also received by the third terminals T3, T3' and the terminal Tj located in the coverage area Z2 of the second terminal T2. Accordingly, the terminals T3, T3', Tj know that a terminal in their coverage area is going to receive data and that they must therefore not send signals that could collide with the data received by that terminal.

The clear-to-send data signal CTS includes information I6 concerning the time remaining before the data transfer is completed. This information I6 is used to update the time parameters associated with the terminals T3, T3' in order for those terminals not to be able to send data until the first terminal T1 has sent the data in its entirety to the second terminal T2, i.e. for a predefined time period, represented in FIG. 5, comprising:
the duration of a first SIFS;
the time to send an RTR signal;
the duration of a second SIFS;
the time to transfer the data D1;
the duration of a third SIFS; and
the time to send an ACK signal.

The clear-to-send data signal CTS further includes information I7 concerning the terminal that is the intended recipient of this signal, i.e. the first terminal T1. This information I7 is intended to advise the first terminal T1 that this clear-to-send data signal CTS is intended for it and therefore that the second terminal T2 is available to receive the data D1 that it wishes to send it and not data that some other terminal might seek to send it.

Finally, the clear-to-send data signal CTS includes control information I8 and I9 respectively sent at the beginning and at the end of the clear-to-send data signal CTS to verify that this signal has been received in its entirety.

If the second terminal T2 is not available to receive the data, the next step is an end of process step 25. The second terminal T2 does not send a clear-to-send data signal CTS and the first terminal T1 therefore does not send the data D1. Under such circumstances, the terminal T1 is generally made to wait for a random time period before attempting again to send the data.

If the third terminals T3, T3' receive the clear-to-send data signal CTS from the second terminal T2, the next step is a step 26 during which each third terminal T3, T3' that has not received the request-to-send signal RTS sends in its coverage area a request-to-receive data signal RTR that is intended to advise the other terminals T4, respectively T4', located in the coverage area of the third terminal T3, respectively T3', that this third terminal T3, respectively T3', is available to receive data D2.

The terminal Tj that receives the clear-to-send data signal CTS from the second terminal T2 and also receives the request-to-send signal RTS from the first terminal T1 does not send a request-to-receive data signal RTR. Because it is located in the coverage area Z1, in which the communication channel is busy transferring data from the first terminal T1 to the second terminal T2, it will not be able to receive data during this data transfer.

By means of the request-to-receive data signal RTR, it is not necessary for another terminal T4, respectively T4', to send a request-to-send data signal RTS or to receive a clear-to-send data signal CTS if it is seeking to send data D2 to the third terminal T3, respectively T3', during the transfer of data from the first terminal T1 to the second terminal T2. That other terminal T4, respectively T4', has already been advised that the third terminal T3, respectively T3', is available to receive its data D2.

Accordingly, there is no risk of the third terminals T3, T3' sending clear-to-send data signals CTS during transfer of the data from the first terminal T1 to the second terminal T2, which avoids collisions between a clear-to-send data signal CTS and the data D1 received by the second terminal T2.

Each request-to-receive data signal RTR carries information I10 concerning the identity of the terminal sending that signal, i.e. the third terminal T3, respectively T3'. Accordingly, the other terminals T4, respectively T4', are advised of the identity of the terminal T3, respectively T3', that is able to receive the data D2.

The request-to-receive data signal RTR preferably includes information I11 concerning the remaining time until the data D1 has been sent in its entirety between the first terminal T1 and the second terminal T2. Accordingly, the terminal T4, T4' can send the data D2 to the corresponding terminal T3, T3' only during a predefined time period represented in FIG. 5 and comprising:
the duration of a first SIFS;
the time to transfer the data D1;
the duration of a second SIFS; and
the time to send an ACK signal.

Finally, the request-to-receive data signal RTR includes information I12 and I13 respectively sent at the beginning and the end of the request-to-receive data signal RTR to verify that the signal has been received in its entirety.

When the waiting time for the first terminal T1 has finished, i.e. when the second terminal T2 can begin to receive the data D1 with no risk of collision, the next step is a step 28 of sending the data D1.

When the data D1 has been sent in its entirety, the next step is a step 30 during which the second terminal T2 sends an acknowledgement signal ACK to the first terminal T1 in order to confirm to it correct reception of the data D1.

The transfer of the data D2 from the terminal T4, T4' to the correspond terminal T3, T3' is interrupted at the same time as the transfer of the data D1 from the first terminal T1 to the second terminal T2. Accordingly, during the step 30, each third terminal T3, T3' also sends an acknowledgement signal ACK to the corresponding terminal T4, T4' to confirm correct reception of the data D2.

It is generally after this step 30 that the blocked terminals Ti, Tj can send again, their time parameter having been decremented while the data was being sent until it reaches the zero value.

It is to be clearly understood that the embodiment that has just been described has no limiting character and is open to any desirable modification without this departing from the scope of the invention.

The invention claimed is:

1. A method of transferring data between a plurality of terminals that communicate via a common communication channel in a wireless network, each terminal being adapted to cover a coverage area, the method including:
a step of sending a request-to-send data signal, RTS, from a first terminal to a second terminal located in a coverage area of the first terminal to advise the second terminal that the first terminal is requesting to send data;
a step of sending a clear-to-send data signal, CTS, from the second terminal to the first terminal to advise the first terminal that the second terminal is available to receive the data;
a step of receiving the clear-to-send data signal, CTS, by a third terminal in a coverage area of the second terminal, the third terminal not having received the request-to-send data signal, RTS, from the first terminal; and
upon receiving the clear-to-send data signal, a step of sending a request-to-receive data signal, RTR, from the third terminal, to advise other terminals located in a coverage area of the third terminal that the third terminal is available to receive data from one of such other terminals during transfer of data from the first terminal to the second terminal, wherein the other terminals are terminals other than the first terminal and the second terminal, and
wherein the clear-to-send data signal, CTS, specifies the intended recipient of that signal, and the request-to-receive data signal, RTR, specified specifies the identity of the third terminal but no intended recipient of that signal.

2. The data transfer method according to claim 1, including, after the step of sending the request-to-send data signal, RTS, from the first terminal, and before a step of transferring the data from the first terminal to the second terminal, a step in the first terminal of waiting for a predefined time period sufficient for the steps of sending the clear-to-send data signal, CTS, from the second terminal and sending the request-to-receive data signal, RTR, from the third terminal to be completed before the step of transferring the data.

3. The data transfer method according to claim 1, wherein at least one of the request-to-send data signal, RTS, and the request-to-receive data signal, RTR, include(s) an identifier of the terminal sending the signal.

4. The data transfer method according to claim 1, wherein at least one of the request-to-send data signal and the clear-to-send data signal include(s) an identifier of a terminal that is an intended recipient of the at least one of the request-to-send data signal and the clear-to-send data signal.

5. The data transfer method according to claim 4, wherein at least one of the request-to-send data signal, RTS, the clear-to-send data signal, CTS, and the request-to-receive data signal, RTR, include(s) information concerning a time to transfer data between the first terminal and the second terminal.

6. The data transfer method according to claim 1, wherein at least one terminal is associated with a time parameter that is decremented over time and is unable to send a signal while this parameter has a non-zero value.

7. The data transfer method according to claim 5, wherein at least one terminal is associated with a time parameter that is decremented over time and is unable to send a signal while this parameter has a non-zero value and wherein, when a terminal receives a request-to-send data signal, RTS, or a clear-to-send data signal, CTS, of which the terminal is not the intended recipient, the time parameter is incremented by a value corresponding to the information concerning the time to transfer data so as to retain a non-zero value until the first terminal has sent the data in its entirety to the second terminal.

8. The data transfer method according to claim 1, wherein the first terminal sends the request-to-send data signal, RTS, only if the data to be transferred has a volume above a predetermined threshold.

9. The data transfer method according to claim 1, wherein the request-to-receive data signal is sent by the third terminal within a predefined time period at the end of which the first terminal will be able to send the data to the second terminal in response to the clear-to-send data signal sent by the second terminal.

10. The data transfer method according to claim 1, further comprising simultaneously transferring data from the first terminal to the second terminal and data from one of the other terminals having received the request-to-receive data signal, RTR, to the third terminal.

11. The data transfer method according to claim 1, wherein the request-to-receive data signal, RTR, includes information concerning a time to transfer data between the first terminal and the second terminal in response to the clear-to-send data signal, CTS, sent by the second terminal to the first terminal.

12. The data transfer method according to claim 1, wherein the request-to-receive data signal, RTR, is sent by the third terminal after a safety time margin following the sending of the clear-to-send data signal, CTS, by the second terminal.

13. The data transfer method according to claim 1, wherein the third terminal is available to receive data from these other terminals during transfer of data from the first terminal to the second terminal.

14. The data transfer method according to claim 1, wherein the other terminals are terminals having not received any of the request-to-send data signal, RTS, from the first terminal and the clear-to-send data signal, CTS, from the second terminal.

15. A non-transitory computer-readable medium storing a data transfer program, for transferring data between a plurality of terminals that communicate via a common communication channel in a wireless network, each terminal being adapted to cover a coverage area, the program comprising:

instructions for sending a request-to-send data signal, RTS, from a first terminal to a second terminal located in a coverage area of the first terminal to advise the second terminal that the first terminal is requesting to send data;

instructions for sending a clear-to-send data signal, CTS, from the second terminal to the first terminal to advise the first terminal that the second terminal is available to receive the data;

instructions for receiving the clear-to-send data signal, CTS, by a third terminal in a coverage area of the second terminal, the third terminal not having received the request-to-send data signal, RTS, from the first terminal; and upon receiving the clear-to-send data signal, instructions for sending a request-to-receive data signal, RTR, from the third terminal, to advise other terminals located in a coverage area of the third terminal that the third terminal is available to receive data from one of such other terminals during transfer of data from the first terminal to the second terminal, wherein the other terminals are terminals other than the first terminal and the second terminal, and wherein the clear-to-send data signal, CTS, specifies the intended recipient of that signal, and the request-to-receive data signal, RTR, specifies the identity of the third terminal but no intended recipient of that signal.

16. A wireless terminal adapted to communicate with other wireless terminals via a common communication channel in a wireless network, incorporating the non-transitory computer-readable medium according to claim 15.

17. A system for transferring data between wireless terminals communicating via a common communication channel in a wireless network, including at least one terminal according to claim 16.

* * * * *